(12) United States Patent
Watanabe

(10) Patent No.: US 7,945,679 B2
(45) Date of Patent: May 17, 2011

(54) PRESENCE SERVICE SYSTEM, A PRESENCE APPARATUS, A PRESENCE SERVICE METHOD, AND A PRESENCE SERVICE PROGRAM

(75) Inventor: Masafumi Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1450 days.

(21) Appl. No.: 11/390,377

(22) Filed: Mar. 28, 2006

(65) Prior Publication Data

US 2006/0224746 A1    Oct. 5, 2006

(30) Foreign Application Priority Data

Mar. 29, 2005    (JP) .................................. 2005-094546

(51) Int. Cl.
*G06F 15/16* (2006.01)
(52) U.S. Cl. ....... 709/227; 379/67.1; 455/41.2; 709/203
(58) Field of Classification Search .................. 379/67.1, 379/142.07, 265.02, 265.09, 265.11; 455/414.1, 455/414.2, 456.1, 41.2; 709/206, 207, 220, 709/227, 203
See application file for complete search history.

(56) References Cited

U.S. PATENT DOCUMENTS

| | | | |
|---|---|---|---|
| 6,658,095 B1 | 12/2003 | Yoakum et al. | |
| 6,885,861 B2 * | 4/2005 | Koskelainen | 455/414.2 |
| 7,203,294 B2 * | 4/2007 | Carnazza et al. | 379/142.07 |
| 7,263,183 B1 * | 8/2007 | Klein et al. | 379/265.09 |
| 7,428,417 B2 * | 9/2008 | Caspi et al. | 455/456.1 |
| 7,509,093 B2 * | 3/2009 | Persson et al. | 455/41.2 |
| 7,631,047 B1 * | 12/2009 | Adamczyk et al. | 709/207 |
| 2003/0037103 A1 * | 2/2003 | Salmi et al. | 709/203 |
| 2003/0065788 A1 * | 4/2003 | Salomaki | 709/227 |
| 2003/0225843 A1 * | 12/2003 | Sakata | 709/206 |
| 2003/0229687 A1 * | 12/2003 | Ohno et al. | 709/220 |
| 2005/0047581 A1 * | 3/2005 | Shaffer et al. | 379/265.11 |
| 2006/0224746 A1 * | 10/2006 | Watanabe | 709/227 |
| 2007/0258576 A1 * | 11/2007 | Klein et al. | 379/265.02 |
| 2008/0268821 A1 * | 10/2008 | Koskela | 455/414.1 |

FOREIGN PATENT DOCUMENTS

| | | |
|---|---|---|
| EP | 1 176 840 A1 | 1/2002 |
| JP | 2004228833 A | 8/2004 |
| JP | 2004272311 A | 9/2004 |
| JP | 2004272724 A | 9/2004 |
| JP | 2004318822 A | 11/2004 |
| JP | 2005-10874 A | 1/2005 |
| JP | 200572783 A | 3/2005 |
| WO | 2004057837 A1 | 7/2004 |

OTHER PUBLICATIONS

M. Day, et al. "A Model for Presence and Instant Messaging," Network Working Group, Request for Comments: 2778, Feb. 2000.

* cited by examiner

*Primary Examiner* — Gerald Gauthier
(74) *Attorney, Agent, or Firm* — Sughrue Mion, PLLC

(57) ABSTRACT

In a presence service system, at least two terminals are connected via a network to each other for communicating presence information therebetween. Each terminal applies a presence notification policy registered corresponding to a condition regarding presence information. A presence service system, a presence apparatus, a presence service method, and a presence service program make it possible to mitigate presence policy setting load imposed onto the user.

47 Claims, 3 Drawing Sheets

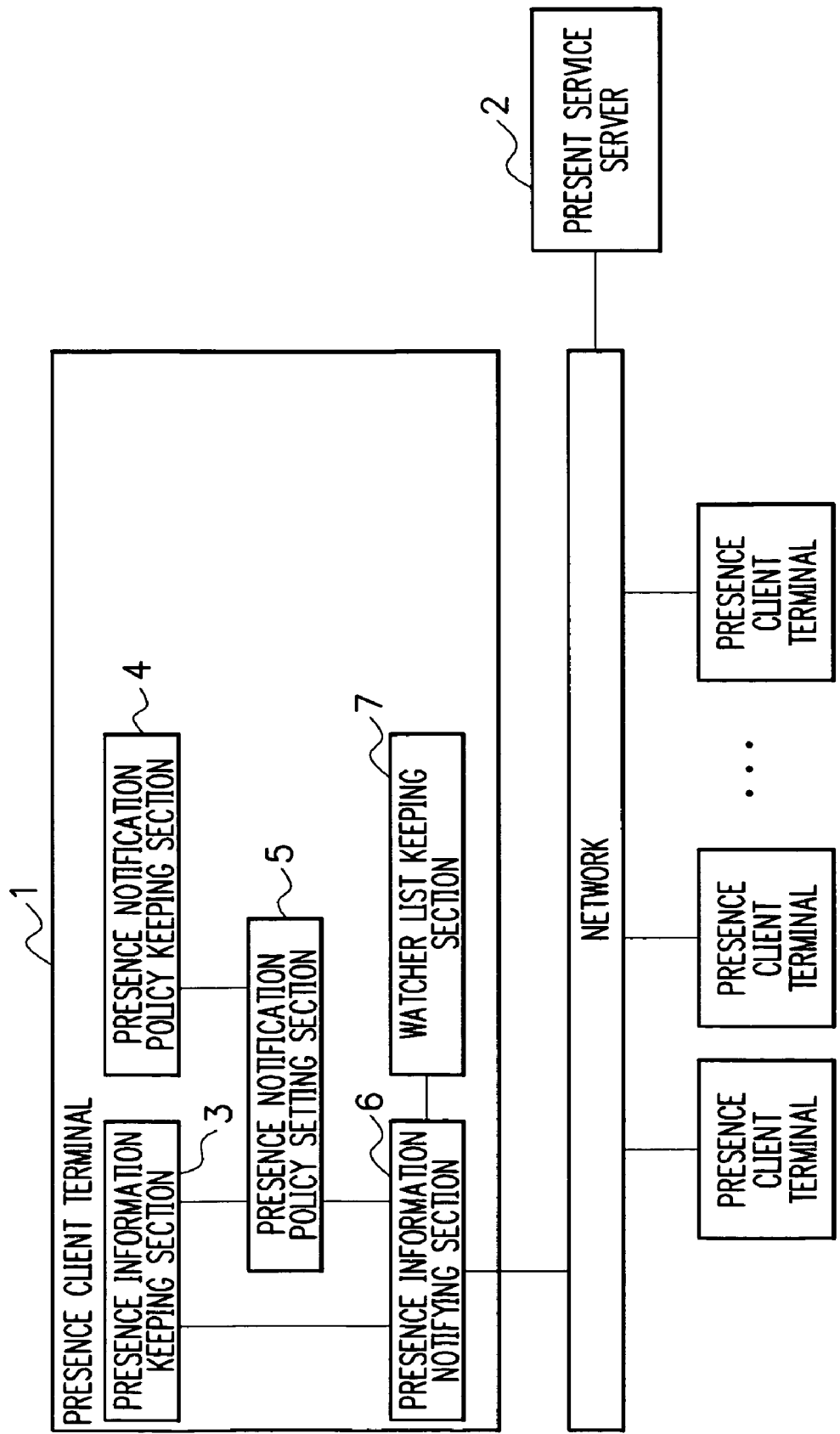

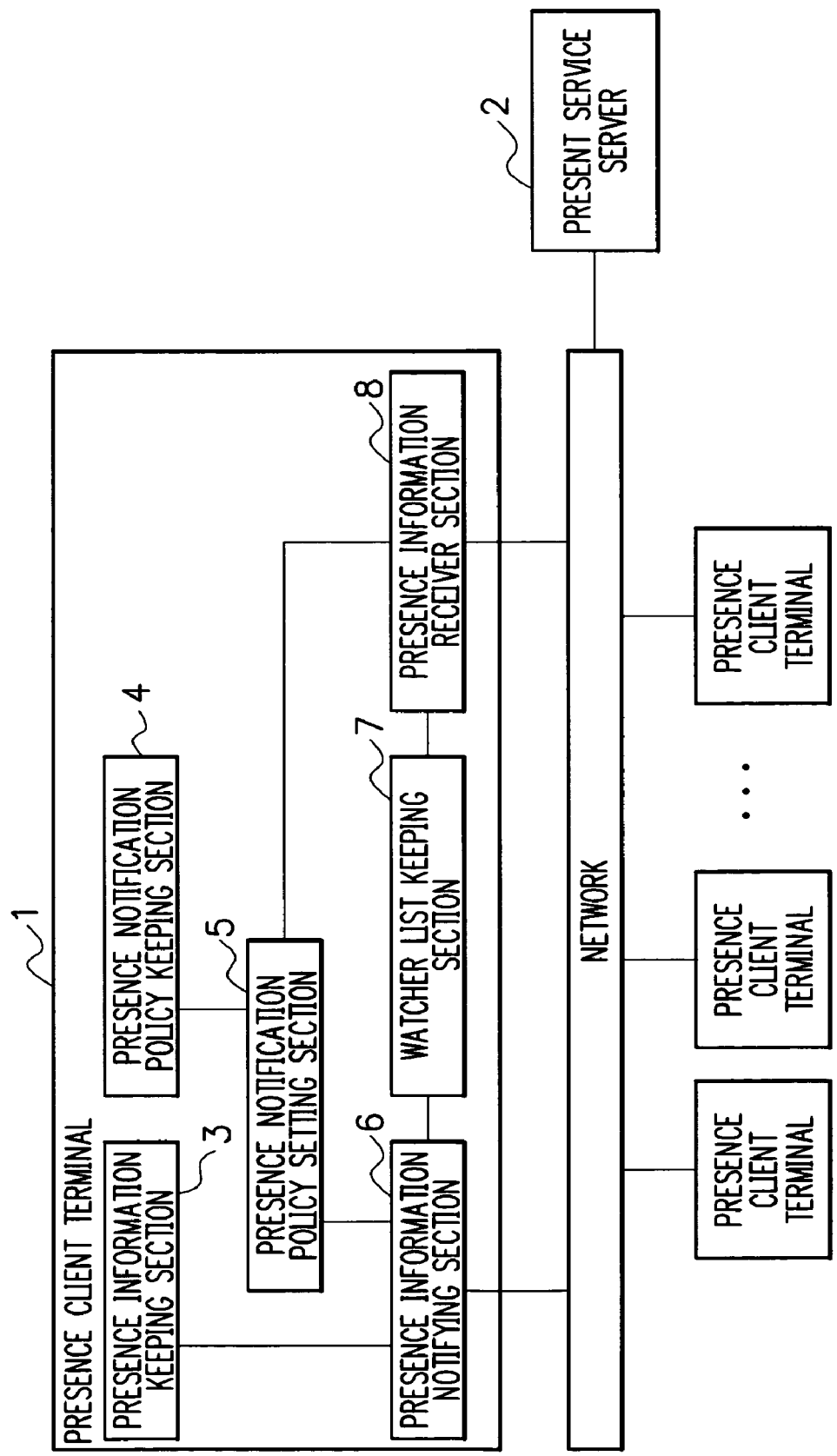

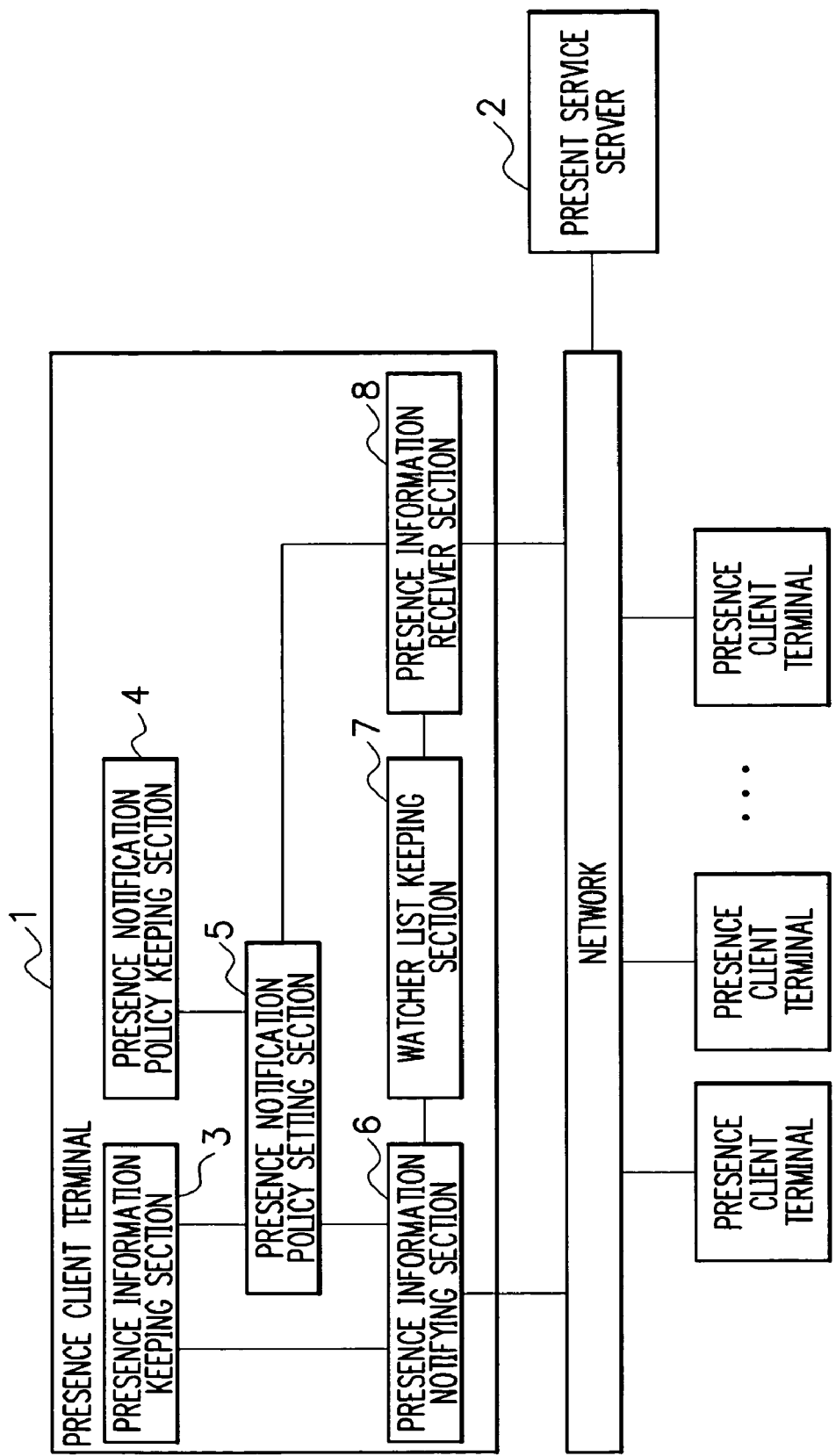

PRESENCE SERVICE SYSTEM, A PRESENCE APPARATUS, A PRESENCE SERVICE METHOD, AND A PRESENCE SERVICE PROGRAM

BACKGROUND OF THE INVENTION

1. Field of the Invention

The present invention relates to a presence service system, a presence apparatus, a presence service method, and a presence service program in which for a presence service, a presence notification policy is set according to change in a state.

2. Description of the Related Art

The presence service is a service to exchange presence information items indicating states, i.e., presence of human beings, articles or items, and services. IETF RFC2778 http://www.ietf.org/rfc/rfc2778.txt describes a basic architecture of the presence service. Clients using the presence service are classified into two types of clients, i.e., presentities (on an information delivery side) such as users providing presence information and watchers (on an information receiver side) observing the presence information. The presence service is a service in which the presence information is received from presentities and is then delivered to watchers.

In an operation in which a user provides presence information from an information processing terminal (to be referred to as a presence client terminal hereinbelow), to protect privacy of the user, it is required to conduct processing to reject a subscription request from a watcher, processing to partly conceal the contents of presence information to be sent to a watcher, or processing to convert the presence information into obscure information by the presence client terminal or a server device (to be referred to as a presence service server hereinbelow) communicating with the presence client terminals. The access control processing is carried out according to a predetermined policy called a presence notification policy. It is required for the user to set the presence notification policy in advance.

The commonly known methods of setting a presence notification policy in the prior art include a method in which a correspondence is established between an identifier of a watcher and a presence notification policy. There also exists a method employing a group in which an identifier of each watcher is registered in advance and the group is related to a presence notification policy. However, these methods are attended with problems. That is, since a presence notification policy is set to an identifier of a watcher or a domain to which a watcher belongs, it is necessary to obtain the identifier or the domain of the watcher to set the presence notification policy to the watcher or the domain. Another problem also appears in association with a new watcher. Each time a new watcher is designated, the watcher is related to a presence notification policy or a group of the watcher is registered for the assignment of the presence notification policy. This leads to a disadvantage that much load is imposed onto the user.

Additionally, Japanese Patent Application Laid-Open Ser. No. 2005-10874 describes a conventional technique for the presence service. According to the technique, "presence control apparatus" is devised for information delivery on assumption that the information provider can designate a user as an information delivery destination with conditions and the user also can specify conditions for information and an information provider where the conditions change frequently.

However, Japanese Patent Application Laid-Open Ser. No. 2005-10874 describes only the registration of conditions regarding information delivery. It is not possible in accordance with the invention to conduct operation in which a condition and a method of notifying presence information are registered as a pair such that a notification method is changed based on which condition is satisfied. Since the information delivery side and the information receiver side mutually specify a condition, privacy of the information delivery side cannot be sufficiently protected.

SUMMARY OF THE INVENTION

It is therefore an object of the present invention, which has been devised to solve the problems described above, to provide a presence service system, a presence apparatus, a presence service method, and a presence service program in which by automatically selecting a presence notification policy according to presence information of a presentity or a watcher, it is possible to reduce, when the user sets a presence notification policy, the policy setting load imposed onto the user.

In accordance with a first aspect of the present invention, there is provided a presence service system including at least two terminals connected via a network to each other for communicating presence information therebetween. The terminals each apply a presence notification policy registered corresponding to a condition regarding presence information.

In accordance with a second aspect of the present invention, there is provided a presence service system including at least two terminals and a server connected via a network to the terminals. The terminals communicate presence information via the server therebetween. The server applies a presence notification policy registered corresponding to a condition regarding presence information.

According to a third aspect of the present invention, in the presence service system in accordance with the first or second aspect, each of the terminal includes at least either one of a transmitting function to transmit the presence information and a receiving function to receive the presence information.

According to a fourth aspect of the present invention, in the presence service system in accordance with one of the first to third aspects, the condition is a condition regarding presence information of a transmission-side terminal, the terminal being one of the terminals which transmits the presence information.

According to a fifth aspect of the present invention, in the presence service system in accordance with one of the first to third aspects, the condition is a condition regarding presence information of a reception-side terminal which is one of the terminals that receives the presence information or a condition including a combination of the condition regarding the presence information of the transmission-side terminal and the condition regarding the presence information of the reception-side terminal.

According to a sixth aspect of the present invention, in the presence service system in accordance with the fourth or fifth aspects, wherein the transmission-side terminal applies the presence notification policy to the reception-side terminals or the reception-side terminals each keeping presence information satisfying the condition.

According to a seventh aspect of the present invention, in the presence service system in accordance with one of the first to sixth aspects, each of the terminals or the server includes a presence information keeping unit for keeping therein the presence information of the transmission-side terminal, a presence notification policy keeping unit for keeping therein the condition and the presence notification policy registered corresponding to the condition, a presence notification policy setting unit for acquiring the presence information of the transmission-side terminal from the presence information keeping unit and determining whether or not the presence information satisfies the condition kept in the presence information keeping unit, a presence information notifying unit for receiving, if the presence information satisfies the condition, the presence notification policy registered corresponding to the condition from the presence notification policy setting unit, and a reception-side terminal list keeping unit for registering a reception-side terminal having issued a subscribe request. The presence information notifying unit notifies, if the presence information satisfies the condition, the presence information obtained from the presence notification policy keeping unit to the reception-side terminal registered to the reception-side terminal list keeping unit, according to the presence notification policy received from the presence notification policy setting unit.

According to an eighth aspect of the present invention, in the presence service system in accordance with the seventh aspect, the presence information notifying unit deletes or changes, according the presence notification policy received from the presence notification policy setting unit, an item of contents of the presence information received from the presence information keeping unit.

According to a ninth aspect of the present invention, in the presence service system in accordance with the seventh or eighth aspect, when the presence information of the presence information keeping unit is updated or when a new presence notification policy is received from the presence notification policy setting unit, the presence information notifying unit notifies the presence information.

According to a tenth aspect of the present invention, in the presence service system in accordance with one of the seventh to ninth aspects, the presence information keeping unit keeps therein an identifier of the reception-side terminal having issued a subscribe request for the presence information of the transmission-side terminal.

According to an 11th aspect of the present invention, the presence service system in accordance with one of the seventh to tenth aspects further includes a presence information receiving unit for receiving the presence information of the reception-side terminal. The presence notification policy setting unit attains the presence information of the reception-side terminal from the presence information receiving unit, determines whether or not the presence information satisfies the condition kept in the presence notification policy keeping unit, and transfers, if the presence information satisfies the condition, the presence notification policy registered corresponding to the condition and an identifier of the reception-side terminal to the presence information notifying unit.

According to a 12th aspect of the present invention, in the presence service system in accordance with the 11th aspect, the presence information keeping unit keeps therein the presence information of the reception-side terminal.

According to a 13th aspect of the present invention, in the presence service system in accordance with the 11th or 12th aspect, the presence information setting unit determines whether or not at least either one the presence information of the transmission-side terminal and the presence information of the reception-side terminal satisfies the condition and transfers, if the condition is satisfied, the presence notification policy registered corresponding to the condition to the presence information notifying unit.

According to a 14th aspect of the present invention, there is provided a presence apparatus for use in a presence service system in accordance with one of the first to 13th aspects, the apparatus being employed as one of the terminals or the server.

According to a 15th aspect of the present invention, there is provided a presence service method of connecting at least two terminals via a network to each other for communicating presence information therebetween. The method includes the step of applying, by each of the terminals, a presence notification policy registered corresponding to a condition regarding presence information.

According to a 16th aspect of the present invention, there is provided a presence service method of connecting at least two terminals and a server via a network to each other, the terminals communicating presence information via the server therebetween. The method includes the step by the server of applying a presence notification policy registered corresponding to a condition regarding presence information.

According to a 17th aspect of the present invention, in the presence service method in accordance with 15th or 16th aspect, the terminals each includes at least one of a transmitting function to transmit the presence information and a receiving function to receive the presence information.

According to an 18th aspect of the present invention, in the presence service method in accordance with one of the 15th to 17th aspects, the condition is a condition regarding presence information of a transmission-side terminal, the terminal being one of the terminals which transmits the presence information.

According to a 19th aspect of the present invention, in the presence service method in accordance with one of 15th to 17th aspects, the condition is a condition regarding presence information of a reception-side terminal, the terminal being one of the terminals which receives the presence information or a condition including a combination of the condition regarding the presence information of the transmission-side terminal and the condition regarding the presence information of the reception-side terminal.

According to a 20th aspect of the present invention, the presence service method in accordance with the 18th or 19th aspect further includes the step by the transmission-side terminal of applying the presence notification policy to the reception-side terminals or the reception-side terminals each keeping presence information satisfying the condition.

According to a 21st aspect of the present invention, the presence service method in accordance with one of 15th to 20th aspects further includes the steps by each of the terminals or the server of registering the condition and the presence notification policy corresponding to the condition, determining whether or not the presence information of the transmission-side terminal satisfies the condition, and notifying, if the presence information satisfies the condition, the presence information to a reception-side terminal registered in advance, according to the presence notification policy registered corresponding to the condition.

According to a 22nd aspect of the present invention, the presence service method in accordance with the 21st aspect further includes the step of deleting or changing, according the presence notification policy, an item of contents of the presence information to be notified to the reception-side terminal.

According to a 23rd aspect of the present invention, the presence service method in accordance with 21st or 22nd aspect further includes the step of notifying the presence information when the presence information is updated or when a new presence notification policy is registered.

According to a 24th aspect of the present invention, the presence service method accordance with one of the 21st to 23rd aspects further includes the steps of keeping an identifier of the reception-side terminal having issued a subscribe request for the presence information of the transmission-side terminal.

According to a 25th aspect of the present invention, the presence service method in accordance with one of 21st to 24th aspects further includes the steps of receiving the presence information of the reception-side terminal, determining whether or not the presence information of the reception-side terminal satisfies the condition, and notifying, if the presence information satisfies the condition, the presence information of the transmission-side terminal to the reception-side terminal, according to the presence notification policy registered corresponding to the condition.

According to a 26th aspect of the present invention, the presence service method in accordance with the 25th aspect further includes the steps of keeping the presence information of the reception-side terminal.

According to a 27th aspect of the present invention, the presence service method in accordance with the 25th or 26th aspect further includes the steps of determining whether or not at least either one the presence information of the transmission-side terminal and the presence information of the reception-side terminal satisfies the condition and applying, if the condition is satisfied, the presence notification policy registered corresponding to the condition.

According to a 28th aspect of the present invention, there is provided a presence service program for performing presence services in which presence information is communicated between a plurality of terminals, the program making a computer execute processing for registering a presence notification policy corresponding to a condition regarding presence information.

According to a 29th aspect of the present invention, in the presence service program in accordance with the 28th aspect, the program makes a computer execute processing for registering a condition regarding presence information of a transmission-side terminal, the terminal being one of the terminals which transmits the presence information.

According to a 30th aspect of the present invention, in the presence service program in accordance with the 28th aspect, the program makes a computer execute processing for registering a condition regarding presence information of a reception-side terminal, the terminal being one of the terminals which receives the presence information or a condition including a combination of the condition regarding the presence information of the transmission-side terminal and the condition regarding the presence information of the reception-side terminal.

According to a 31st aspect of the present invention, in the presence service program in accordance with the 29th or 30th aspect, the program makes a computer execute presence notification policy registering processing for registering the presence notification policy corresponding to the condition, presence notification policy determining processing for acquiring the presence information of the transmission-side terminal and determining whether or not the presence information satisfies the condition, reception-side terminal registering processing for registering a reception-side terminal having issued a subscribe request, and the presence information notifying processing for notifying, if the presence information satisfies the condition, the presence information to the reception-side terminal thus registered, according to the presence notification policy registered according to the condition.

According to a 32nd aspect of the present invention, in the presence service program in accordance with the 31st aspect, the program makes a computer execute deleting or changing processing for deleting or changing an item of contents of the presence information, according the presence notification policy.

According to a 33rd aspect of the present invention, in the presence service program in accordance with the 31st or 32nd aspect, the program makes a computer execute the presence information notifying processing when the presence information of the presence information keeping processing is updated or when a new presence notification policy is received from the presence notification policy setting processing.

According to a 34th aspect of the present invention, in the presence service program in accordance with one of the 31s to 33rd aspects, the program makes a computer execute, in the reception-side terminal registering processing, processing for registering an identifier of the reception-side terminal having issued a subscribe request for the presence information of the transmission-side terminal.

According to a 35th aspect of the present invention, in the presence service program in accordance with one of the 31st to 34th aspects, the program makes a computer execute presence information receiving processing for receiving the presence information of the reception-side terminal, processing, in the presence notification policy determining processing, for determining whether or not the presence information of the reception-side terminal satisfies the condition, and processing in the presence information notifying processing, if the presence information satisfies the condition, for notifying the presence information of the transmission-side terminal to the reception-side terminal, according to the presence notification policy registered corresponding to the condition.

According to a 36th aspect of the present invention, in the presence service program in accordance with the 35th aspect, the program makes a computer execute processing for registering the presence information of the reception-side terminal.

According to a 37th aspect of the present invention, in the presence service program in accordance with the 35th or 36th aspect, the program makes a computer execute processing, in the presence notification policy determining processing, for determining whether or not at least either one the presence information of the transmission-side terminal and the presence information of the reception-side terminal satisfies the condition, and processing for notifying, if the condition is satisfied, the presence information of the transmission-side terminal to the reception-side terminal, according to the presence notification policy registered corresponding to the condition.

In accordance with the present invention, it is possible for the user to more easily set a presence notification policy.

BRIEF DESCRIPTION OF THE DRAWINGS

The objects and features of the present invention will become more apparent from the consideration of the following detailed description taken in conjunction with the accompanying drawings in which:

FIG. 1 is a schematic block diagram showing a configuration of a first embodiment in accordance with the present invention;

FIG. 2 is a block diagram schematically showing a configuration of second embodiment in accordance with the present invention; and FIG. 3 is a schematic block diagram showing a structure of a third embodiment in accordance with the present invention.

DESCRIPTION OF THE EMBODIMENTS

Referring now to the accompanying drawings, description will be given in detail of embodiments of the present invention.

In accordance with the present invention, a presence notification policy is beforehand registered in correspondence with conditions regarding presence information such that a presence notification policy is automatically set according to presence information of a presentity or a watcher. This advantageously reduces the load imposed onto the user to set a presence notification policy.

Specifically, a presence notification policy is registered in advance with a relationship established between the policy and a predetermined condition. A check is made to determine whether or not presence information of the user or another user satisfies a condition. If the condition is satisfied, a presence notification policy related to the condition is applied to all watchers. Alternatively, the presence notification policy is applied only to the watchers having the presence information satisfying the condition.

First Embodiment

FIG. 1 shows a construction of a first embodiment of the present invention. The embodiment includes a presence client terminal 1 operated by a user, a presence service server 2 and a network. As can be seen from FIG. 1, a plurality of presence client terminals are coupled via the network to the presence service server 2.

The server 2 is a server unit to deliver presence information from a presentity to watchers to achieve a presence service.

The presence client terminal 1 is an information processing terminal module having a presentity and watcher function, i.e., a function to communicate presence information. The terminal includes a presence information keeping section 3, a presence notification policy storage section 4, a presence notification policy setting section 5, a presence information notifying section 6, and a watcher list keeping section 7. The presence service server 2 may include the constituent elements 3 to 7 such that operations of processing described below are carried out under control of programs.

The presence information storage 3 keeps current presence information of each presentity. The presence notification policy storage 4 stores and keeps therein a condition and a presence notification policy registered corresponding to the condition. The present notification policy setting unit 5 determines whether or not presence information acquired from the presence information storage 3 satisfies each predetermined condition kept in the policy storage 4. If the condition is satisfied, presence notification policies registered in association with the condition are passed to the presence information notifying module 6.

The notifying module 6 notifies presence information via the server 2 to watchers. The module 6 then obtains the presence information from the presence information storage 3. The notifying module 6 can delete or change an item of the presence information according to the presence notification policy before notifying the presence information. When the presence information kept in the information storage 3 is updated or when a new presence notification policy is passed from the policy setting module 5 to the notifying unit 6, the presence information is notified.

Description will now be given of operation of the first embodiment. The presence client terminal 1 executes processing under control of programs as follows.

Assume that user A, namely, a user of the client terminal 1 has basic presence information, job presence information, and position presence information in the terminal 1. The basic presence information indicates whether the terminal 1 is "on-line" or "off-line". The job presence information denotes whether user A is "at work" or "private". The position presence information designates a current position of user A.

Step 1

Assume in the first embodiment that user A has presence information, for example, "on-line,private,Tokyo". The presence information storage 3 of the terminal 1 keeps the presence information.

Step 2

User A registers a presence notification policy from the terminal 1. To the presence notification policy storage 4 of the terminal 1, "to notify basic presence information and position presence information" is registered as presence notification policy 1 corresponding to condition 1 "job presence information=at work", and then "to notify basic presence information" is registered as presence notification policy 2 corresponding for condition 2 "job presence information=private".

Step 3

The presence notification policy setting section 5 of the client terminal 1 attains the presence information "on-line, private,Tokyo" of user A from the presence information storage 3 to determine whether or not the information satisfies the conditions in the policy storage 4. Since the presence information of user A satisfies condition 2 "job presence information=private", presence notification policy 2 "to notify basic presence information" is fed to the information notifying section 6.

Step 4

According to presence notification policy 2, the notifying section 6 creates policy-applied presence information "on-line" from the presence information "on-line,private,Tokyo" in the presence information storage 3 and keeps that information. At this point of time, since no watcher of user A has been registered, the notifying section 6 does not notify presence information.

Step 5

User B (a presence client terminal other than the presence client terminal 1) issues a "subscribe request" for the presence information of user A. The notifying unit 6 of the terminal 1 receives the request and then additionally registers user B to the watcher list storage 7. The notifying unit 6 also notifies the policy-applied presence information "on-line" to user B.

Step 6

Assume that user A changes the presence information from "on-line,private,Tokyo" to "on-line,at work,Tokyo".

Step 7

Processing is executed effectively as in step 3. The presence information of user A satisfies condition 1 "job presence information=at work", and hence a presence notification policy corresponding thereto, namely, presence notification policy 1 "to notify basic presence information and position presence information" is delivered to the presence information notifying section 6.

Step 8

Using presence notification policy 1, the notifying section 6 produces policy-applied presence information "on-line,Tokyo" from the presence information "on-line,at work,Tokyo" in the presence information storage 3 and then transfers the presence information "on-line,Tokyo" to each watcher (user B in this situation) designated in the watcher list storage 7.

Step 9

After user A changes the presence information, processing through steps 6 to 8 is iterated.

Step 10

When user B issues a "subscribe release request", user B is not notified of the presence information.

In the description of the first embodiment, each of the presence client terminals of users A and B includes a presentity and watcher function. However, the terminal of user A may include only a presentity function and that of user B may include only a watcher function.

Second Embodiment

FIG. 2 shows a structure of the second embodiment in accordance with the present invention. The embodiment includes a presence service server 2, a presence client terminal 1 to receive a service from the server 2, and a network. Specifically, a plurality of presence client terminals is linked via the network to the server 2 as shown in FIG. 2.

The server 2 provides services in which presence information is delivered from presentities to watchers.

The presence client terminal 1 is an information processing terminal having the presentity and watcher function. The terminal includes a presence information storage section 3, a presence notification policy keeping unit 4, a presence notification policy setting module 5, a presence information notifying section 6, a watcher list storage unit 7, and a presence information receiver module 8. The system may be configured such that the presence service server 2 includes the components 3 to 8 to conduct operations of processing described below by use of programs.

The presence information storage 3 keeps therein current presence information of each presentity. The presence notification policy storage 4 stores a condition and a presence notification policy specified corresponding to the condition. The present notification policy setting module 5 determines whether or not presence information obtained from the presence information receiver module 8 satisfies each predetermined condition of the presence notification policy storage 4. If the condition is satisfied, a presence notification policy registered corresponding to the condition and a watcher identifier are transferred to the presence information notifying section 6.

The notifying section 6 sends presence information via the server 2 to watchers. Thereafter, the notifying module 6 obtains the presence information from the presence information storage 3. The notifying module 6 can delete or change an item of the presence information according to the presence notification policy. When the presence information in the information receiver 8 is updated or when a new presence notification policy and a new watcher identifier are received from the policy setting unit 5, the notifying module 6 notifies the presence information. It is particularly possible in the second embodiment to deliver mutually different presence information to each watcher.

The watcher list storage unit 7 keeps therein a watcher identifier of a watcher having issued a "subscribe request" for presence information of presentities.

The presence information receiver 8 has a function to receive presence information of a presentity notified via the presence service server 2. If the watcher list storage 7 has been accessed and it is detected that the watcher list also includes an associated presentity identifier, the information receiver 8 can keep the presence information thus received, as presence information of a watcher.

Next, description will be given of operation of the second embodiment. It is assumed in the embodiment that user A, user B, and user C each have basic presence information, job presence information, and position presence information. The presence client terminals of users B and C are configured in the same way as the terminal of user A.

Step 1

Presence information of user A is "on-line,at work,Tokyo". Since no watcher has subscribed to user A before this point of time, the watcher list storage 7 does not include any watcher identifier registered thereto.

Step 2

Presence information of user B is "on-line,private, Nagoya" and presence information of user C is "on-line,at work,Ohsaka".

Step 3

User A registers a presence notification policy. Presence notification policy 3 "to notify basic presence information and position presence information" corresponding to condition 3 "job presence information of watcher=at work" is registered to the presence notification policy storage 4 of the terminal 1 of user A. Thereafter, presence notification policy 4 "to notify basic presence information" corresponding to condition 4 "job presence information of watcher=private" is registered to the policy storage 4.

Step 4

User B issues "subscribe request" for presence information of user A. The presence information notifying section 6 of terminal 1 of user A receives the request and then newly registers user B to the watcher list storage 7.

Step 5

User B sends presence information to user A. The presence information receiver module 8 of user A receives the presence information "on-line,private,Nagoya" from user B. Since an identifier of user B has been registered to the watcher list storage 7, the receiver 8 keeps therein the presence information.

Step 6

The policy setting unit 5 of user A attains the presence information "on-line,private,Nagoya" from the presence information receiver 8 and determines whether or not the information satisfies the conditions in the presence information policy storage 4. Since the presence information of user B satisfies condition 4 "job presence information of watcher=private", presence notification policy 4 "to notify basic presence information" corresponding to condition 4 and an identifier of user B are fed to the information notifying section 6.

Step 7

By use of presence notification policy 4, the notifying section 6 generates policy-applied presence information "on-line" from the presence information "on-line,at work,Tokyo" in the presence information storage 3 and transfers the presence information to user B.

Step 8

After user B changes the presence information, processing through steps 5 to 7 is iterated.

Step 9

User C issues a "subscribe request" for presence information of user A as in step 4.

Step 10

The receiver module 8 of user A receives and keeps presence information of user C in the same way as step 5.

Step 11

As in step 6, the policy setting unit 5 of user A obtains the presence information of user C "on-line,at work,Ohsaka" from the receiver module 8 and then determines whether or not the information satisfies the conditions of the policy storage 4. Since the presence information of user C satisfies condition 3 "job presence information of watcher=at work", presence notification policy 3 "to notify basic presence information and position presence information" corresponding to condition 3 and an identifier of user C are sent to the information notifying module 6.

Step 12

According to presence notification policy 3, the notifying module 6 produces as in step 7 policy-applied presence information "on-line,Tokyo" from the presence information "on-line,at work,Tokyo" of the presence information storage 3 and passes the presence information to user C.

Step 13

When user C alters the presence information, processing through steps 10 to 12 is iterated.

Third Embodiment

In the third embodiment of the present invention, a presence notification policy is set to a combinational condition including a combination of a condition for presence information of a presentity and a condition for presence information of a watcher. Therefore, according to presence information of a presentity and presence information of a watcher, a presence notification policy can be selected. FIG. 3 shows a configuration of the third embodiment. The embodiment is similar in structure to the second embodiment excepting the presence notification policy setting unit 5 and the presence information notifying section 6.

The policy setting unit 5 of the third embodiment determines whether or not presence information of a presentity from the information storage 3 and presence information of a watcher from the information receiver 8 satisfy a combinational condition including a condition for the presence information of a presentity and a condition for the presence information of a watcher in the storage 4. If the combinational condition is satisfied, a presence notification policy and a watcher identifier registered in association with the condition are delivered to the notifying section 6.

The notifying section 6 notifies presence information via the presence service server 2 to the watchers. The presence information is attained from the presence information storage 3.

According to the presence notification policy, it is possible to delete or to alter an item of the contents of the presence information. When the presence information of the watcher kept in the information receiving module 8 is updated, when the presence information of the presentity kept in the information storage 3 is updated, or when a new presence notification policy and a watcher identifier are passed from the policy setting module 5, the notifying unit 6 notifies associated presence information. It is possible particularly in the third embodiment to deliver mutually different presence information items to each watcher.

According to the third embodiment, in association with, for example, a condition "job presence information of presentity=at work AND job presence information of watcher=at work", it is possible to register a presence notification policy "to notify basic presence information and position presence information". If job presence information of the user is "at work", the basic presence information and the position presence information can be sent to the watchers of which the job presence is "at work".

Fourth Embodiment

In the fourth embodiment of the present invention, it can also be considered to register a presence notification policy "to notify basic presence information, job presence information, and position presence information" corresponding to a condition "position presence information of presentity=position presence information of watcher". In the example, the user can disclose the basic, job, position information items to the watchers disclosing position presence of the same position with the user. In the fourth embodiment, regardless of the contents of the position presence information of the user, it is possible to easily set a presence notification policy to the watchers disclosing the same position presence information as that of the user.

In the description of the first to fourth embodiments, the presence information is notified to watchers from presentities via the presence service server 2 connected to a network. However, the presence client terminals may directly communicate presence information each other via a network without using the server 2.

In the explanation of the first to fourth embodiments, the presence notification policy specifies presence information to be notified to watchers. However, the present invention is not restricted by the example. The presence notification policy may designate, for example, that first presence information is replaced by second presence information. Alternatively, the policy may specify that detailed presence information is converted into obscure presence information before notification thereof. The policies are particularly effective when the user desires to conceal from the communicating partner a fact that the user rejects notification of presence information.

According to the first to fourth embodiments described above, there is obtained a first advantage that the load of policy setting operation imposed onto the user can be mitigated. The operation to set a presence notification policy includes only prior registration of a relationship between a condition and a presence notification policy. It is not required for the user to conduct the policy setting operation each time a watcher is added to the system.

Additionally, there is also attained a second advantage that the user can simply disclose presence information in cooperation with another service. To disclose presence information while using a predetermined service, the user can register a presence notification policy in association with presence information indicating a state of usage of the service. Even when the kind of presence information required for the service is changed, the user can easily deal with the change only by altering the presence notification policy beforehand registered in association with a state of usage of the service.

Particularly, according to the second embodiment, a first user can easily disclose presence information to other users in a situation substantially equal to the situation of the first user. Also, according to the fourth embodiment, when a first user designates a condition including a relationship between presence information of the first user and presence information of a watcher, it is possible for the first user, for example, to apply a presence notification policy to the watchers disclosing presence information equal to the presence information of the first user.

Resultantly, according to the first to fourth embodiments, the user can set a presence information notification policy by assuming a specific situation. This expectedly reduces operation errors when a presence information notification policy is set.

Description has been given of the first to fourth embodiments in accordance with the present invention. However, the present invention is not restricted by the embodiments. The embodiments can be changed or modified in various ways within the gist of the present invention.

The present invention is applicable generally to presence services including systems, apparatuses, and software which are associated with the presence services. The present invention can be applied to, for example, a personal digital assistance including a presence notifying function, a communication terminal capable of allowing only a communicating partner to view position presence of the user of the communication terminal, and software of a game between a fist partner and a second partner to notify presence or absence of either one of the first and second partners to the remaining partner of the game only during the game.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A presence service system, comprising at least two terminals connected via a network to each other for communicating presence information therebetween,
   wherein each terminal applies a presence notification policy registered corresponding to a condition regarding presence information; and
   wherein each of the terminals comprises:
   presence information keeping means for keeping therein the presence information of the transmission-side terminal;
   presence notification policy keeping means for keeping therein the condition and the presence notification policy registered corresponding to the condition;
   presence notification policy setting means for acquiring the presence information of the transmission-side terminal from the presence information keeping means and determining whether or not the presence information satisfies the condition kept in the presence information keeping means;
   presence information notifying means for receiving, if the presence information satisfies the condition, the presence notification policy registered corresponding to the condition from the presence notification policy setting means; and
   reception-side terminal list keeping means for registering a reception-side terminal having issued a subscribe request,
   the presence information notifying means notifying, if the presence information satisfies the condition, the presence information obtained from the presence notification policy keeping means to the reception-side terminal registered to the reception-side terminal list keeping means, according to the presence notification policy received from the presence notification policy setting means.

2. A presence service system, comprising:
   at least two terminals; and
   a server connected via a network to the terminals, the terminals communicating presence information via the server therebetween, wherein the server applies a presence notification policy registered corresponding to a condition regarding presence information; and
   wherein each of the terminals or the server comprises:
   presence information keeping means for keeping therein the presence information of the transmission-side terminal;
   presence notification policy keeping means for keeping therein the condition and the presence notification policy registered corresponding to the condition;
   presence notification policy setting means for acquiring the presence information of the transmission-side terminal from the presence information keeping means and determining whether or not the presence information satisfies the condition kept in the presence information keeping means;
   presence information notifying means for receiving, if the presence information satisfies the condition, the presence notification policy registered corresponding to the condition from the presence notification policy setting means; and
   reception-side terminal list keeping means for registering a reception-side terminal having issued a subscribe request,
   the presence information notifying means notifying, if the presence information satisfies the condition, the presence information obtained from the presence notification policy keeping means to the reception-side terminal registered to the reception-side terminal list keeping means, according to the presence notification policy received from the presence notification policy setting means.

3. The presence service system in accordance with claim 1, wherein each terminal comprises at least either one of a transmitting function to transmit the presence information and a receiving function to receive the presence information.

4. The presence service system in accordance with claim 1, wherein the condition is a condition regarding presence information of a transmission-side terminal, the terminal being one of the terminals which transmits the presence information.

5. The presence service system in accordance with claim 1, wherein the condition is a condition regarding presence information of a reception-side terminal, the terminal being one of the terminals which receives the presence information or a condition including a combination of the condition regarding the presence information of the transmission-side terminal and the condition regarding the presence information of the reception-side terminal.

6. The presence service system in accordance with claim 4, wherein the transmission-side terminal applies the presence notification policy to the reception-side terminals or the reception-side terminals each keeping presence information satisfying the condition.

7. The presence service system in accordance with claim 5, wherein the transmission-side terminal applies the presence notification policy to the reception-side terminals or the reception-side terminals each keeping presence information satisfying the condition.

8. The presence service system in accordance with claim 1 or 2, wherein when the presence information of the presence information keeping means is updated or when a new presence notification policy is received from the presence notification policy setting means, the presence information notifying means notifies the presence information.

9. The presence service system in accordance with claim 1 or 2, further comprising presence information receiving means for receiving the presence information of the reception-side terminal, wherein
   the presence notification policy setting means attains the presence information of the reception-side terminal from the presence information receiving means, determines whether or not the presence information satisfies the condition kept in the presence notification policy keeping means, and transfers, if the presence information satisfies the condition, the presence notification policy registered corresponding to the condition and an identifier of the reception-side terminal to the presence information notifying means.

10. The presence service system in accordance with claim 9, wherein the presence information keeping means keeps therein the presence information of the reception-side terminal.

11. The presence service system in accordance with claim 9, wherein the presence information setting means determines whether or not at least either one the presence information of the transmission-side terminal and the presence information of the reception-side terminal satisfies the condition and transfers, if the condition is satisfied, the presence notification policy registered corresponding to the condition to the presence information notifying means.

12. The presence apparatus for use in a presence service system in accordance with claim 1, the apparatus being employed as one of the terminals or the server.

13. The presence service system in accordance with claim 2, wherein each terminal comprises at least either one of a transmitting function to transmit the presence information and a receiving function to receive the presence information.

14. The presence service system in accordance with claim 2, wherein the condition is a condition regarding presence information of a transmission-side terminal, the terminal being one of the terminals which transmits the presence information.

15. The presence service system in accordance with claim 2, wherein the condition is a condition regarding presence information of a reception-side terminal, the terminal being one of the terminals which receives the presence information or a condition including a combination of the condition regarding the presence information of the transmission-side terminal and the condition regarding the presence information of the reception-side terminal.

16. The presence service system in accordance with claim 14, wherein the transmission-side terminal applies the presence notification policy to the reception-side terminals or the reception-side terminals each keeping presence information satisfying the condition.

17. The presence service system in accordance with claim 15, wherein the transmission-side terminal applies the presence notification policy to the reception-side terminals or the reception-side terminals each keeping presence information satisfying the condition.

18. The presence service system in accordance with claim 1 or 2, wherein the presence information notifying means deletes or changes, according the presence notification policy received from the presence notification policy setting means, an item of contents of the presence information received from the presence information keeping means.

19. The presence service system in accordance with claim 1 or 2, wherein the presence information keeping means keeps therein an identifier of the reception-side terminal having issued a subscribe request for the presence information of the transmission-side terminal.

20. The presence apparatus for use in a presence service system in accordance with claim 2, the apparatus being employed as one of the terminals or the server.

21. A presence service method of connecting at least two terminals via a network to each other for communicating presence information therebetween, comprising:
the steps, by each of the terminals, of:
applying a presence notification policy registered corresponding to a condition regarding presence information;
registering the condition and the presence notification policy corresponding to the condition;
determining whether or not the presence information of the transmission-side terminal satisfies the condition; and
notifying, if the presence information satisfies the condition, the presence information to a reception-side terminal registered in advance, according to the presence notification policy registered corresponding to the condition.

22. A presence service method of connecting at least two terminals and a server via a network to each other, the terminals communicating presence information via the server therebetween, comprising:
the step by the server of applying a presence notification policy registered corresponding to a condition regarding presence information; and
the steps by each of the terminals or the server of:
registering the condition and the presence notification policy corresponding to the condition;
determining whether or not the presence information of the transmission-side terminal satisfies the condition; and
notifying, if the presence information satisfies the condition, the presence information to a reception-side terminal registered in advance, according to the presence notification policy registered corresponding to the condition.

23. The presence service method in accordance with claim 21, the terminals each comprising at least one of a transmitting function to transmit the presence information and a receiving function to receive the presence information.

24. The presence service method in accordance with claim 21, wherein the condition is a condition regarding presence information of a transmission-side terminal, the terminal being one of the terminals which transmits the presence information.

25. The presence service method in accordance with claim 21, wherein the condition is a condition regarding presence information of a reception-side terminal, the terminal being one of the terminals which receives the presence information or a condition including a combination of the condition regarding the presence information of the transmission-side terminal and the condition regarding the presence information of the reception-side terminal.

26. The presence service method in accordance with claim 24, further comprising the step by the transmission-side terminal of applying the presence notification policy to the reception-side terminals or the reception-side terminals each keeping presence information satisfying the condition.

27. The presence service method in accordance with claim 25, further comprising the step by the transmission-side terminal of applying the presence notification policy to the reception-side terminals or the reception-side terminals each keeping presence information satisfying the condition.

28. The presence service method in accordance with claim 21 or 22, further comprising the step of notifying the presence information when the presence information is updated or when a new presence notification policy is registered.

29. The presence service method in accordance with claim 21 or 22, further comprising the steps of:
receiving the presence information of the reception-side terminal;
determining whether or not the presence information of the reception-side terminal satisfies the condition; and
notifying, if the presence information satisfies the condition, the presence information of the transmission-side terminal to the reception-side terminal, according to the presence notification policy registered corresponding to the condition.

30. The presence service method in accordance with claim 29, further comprising the steps of keeping the presence information of the reception-side terminal.

31. The presence service method in accordance with claim 29, further comprising the steps of:
   determining whether or not at least either one the presence information of the transmission-side terminal and the presence information of the reception-side terminal satisfies the condition; and
   applying, if the condition is satisfied, the presence notification policy registered corresponding to the condition.

32. The presence service method in accordance with claim 22, the terminals each comprising at least one of a transmitting function to transmit the presence information and a receiving function to receive the presence information.

33. The presence service method in accordance with claim 22, wherein the condition is a condition regarding presence information of a transmission-side terminal, the terminal being one of the terminals which transmits the presence information.

34. The presence service method in accordance with claim 22, wherein the condition is a condition regarding presence information of a reception-side terminal, the terminal being one of the terminals which receives the presence information or a condition including a combination of the condition regarding the presence information of the transmission-side terminal and the condition regarding the presence information of the reception-side terminal.

35. The presence service method in accordance with claim 33, further comprising the step by the transmission-side terminal of applying the presence notification policy to the reception-side terminals or the reception-side terminals each keeping presence information satisfying the condition.

36. The presence service method in accordance with claim 34, further comprising the step by the transmission-side terminal of applying the presence notification policy to the reception-side terminals or the reception-side terminals each keeping presence information satisfying the condition.

37. The presence service method in accordance with claim 21 or 22, further comprising the step of deleting or changing, according the presence notification policy, an item of contents of the presence information to be notified to the reception-side terminal.

38. The presence service method accordance with claim 21 or 22, further comprising the steps of keeping an identifier of the reception-side terminal having issued a subscribe request for the presence information of the transmission-side terminal.

39. A non-transitory computer-readable medium having recorded thereon a program for enabling a computer to carry out a method comprising:
   processing for registering a presence notification policy corresponding to a condition regarding presence information, wherein the presence information is communicated between a plurality of terminals;
   processing for registering a condition regarding presence information of a transmission-side terminal, the terminal being one of the terminals which transmits the presence information;
   presence notification policy registering processing for registering the presence notification policy corresponding to the condition;
   presence notification policy determining processing for acquiring the presence information of the transmission-side terminal and determining whether or not the presence information satisfies the condition;
   reception-side terminal registering processing for registering a reception-side terminal having issued a subscribe request; and
   the presence information notifying processing for notifying, if the presence information satisfies the condition, the presence information to the reception-side terminal thus registered, according to the presence notification policy registered according to the condition.

40. A non-transitory computer readable medium having recorded thereon a program for enabling a computer to carry out a method comprising:
   processing for registering a presence notification policy corresponding to a condition regarding presence information, wherein the presence information is communicated between a plurality of terminals;
   processing for registering a condition regarding presence information of a reception-side terminal, the terminal being one of the terminals which receives the presence information or a condition including a combination of the condition regarding the presence information of the transmission-side terminal and the condition regarding the presence information of the reception- side terminal;
   presence notification policy registering processing for registering the presence notification policy corresponding to the condition;
   presence notification policy determining processing for acquiring the presence information of the transmission-side terminal and determining whether or not the presence information satisfies the condition;
   reception-side terminal registering processing for registering a reception-side terminal having issued a subscribe request; and
   the presence information notifying processing for notifying, if the presence information satisfies the condition, the presence information to the reception-side terminal thus registered, according to the presence notification policy registered according to the condition.

41. The non-transitory computer readable medium having recorded thereon a program according to claim 39 or 40, wherein the presence information notifying processing is executed when the presence information of the presence information keeping processing is updated or when a new presence notification policy is received from the presence notification policy setting processing.

42. The non-transitory computer readable medium having recorded thereon a program according to claim 39 or 40, further comprising:
   presence information receiving processing for receiving the presence information of the reception-side terminal;
   processing, in the presence notification policy determining processing, for determining whether or not the presence information of the reception-side terminal satisfies the condition; and
   processing in the presence information notifying processing, if the presence information satisfies the condition, for notifying the presence information of the transmission-side terminal to the reception-side terminal, according to the presence notification policy registered corresponding to the condition.

43. The non-transitory computer readable medium having recorded thereon a program according to claim 42, further comprising:
   processing for registering the presence information of the reception-side terminal.

44. The non-transitory computer readable medium having recorded thereon a program according to claim 42, further comprising:
processing, in the presence notification policy determining processing, for determining whether or not at least either one the presence information of the transmission-side terminal and the presence information of the reception-side terminal satisfies the condition; and
processing for notifying, if the condition is satisfied, the presence information of the transmission-side terminal to the reception-side terminal, according to the presence notification policy registered corresponding to the condition.

45. The non-transitory computer readable medium having recorded thereon a program according to claim 39 or 40, further comprising;
deleting or changing processing for deleting or changing an item of contents of the presence information, according the presence notification policy.

46. The non-transitory computer readable medium having recorded thereon a program according to claim 39 or 40, further comprising:
processing for registering an identifier of the reception-side terminal having issued a subscribe request for the presence information of the transmission-side terminal in the reception-side terminal registering processing.

47. A presence service method of connecting at least two terminals via a network to each other for communicating presence information therebetween, comprising the steps, by each of the terminals, of:
applying a presence notification policy registered corresponding to a condition regarding presence information;
determining whether or not at least either one the presence information of the transmission-side terminal and the presence information of the reception-side terminal satisfies the condition; and
applying, if the condition is satisfied, the presence notification policy registered corresponding to the condition;
wherein the condition is a condition regarding presence information of a transmission-side terminal, the terminal being one of the terminals which transmits the presence information.

* * * * *